United States Patent [19]

Vize

[11] Patent Number: 4,694,870
[45] Date of Patent: Sep. 22, 1987

[54] VENTED FUEL SYSTEM FOR A VEHICLE

[75] Inventor: Robert M. Vize, Bettendorf, Iowa

[73] Assignee: Caterpillar Inc., Peoria, Ill.

[21] Appl. No.: 873,977

[22] Filed: Jun. 13, 1986

[51] Int. Cl.⁴ .............................................. B65B 3/04
[52] U.S. Cl. .................................... 141/326; 137/263; 137/265; 180/314; 220/203; 220/371
[58] Field of Search ................ 180/314; 137/263, 265; 141/37, 325, 326, 327; 220/203, 371, 373; 280/5 H, 5 A

[56] References Cited

U.S. PATENT DOCUMENTS

| | | | |
|---|---|---|---|
| 2,946,598 | 7/1960 | Foster | 280/5 |
| 3,311,183 | 3/1967 | Phillips | 180/1 |
| 3,677,284 | 7/1972 | Mendez | 137/351 |
| 3,995,657 | 12/1976 | Horrey | 137/529 |
| 4,223,899 | 9/1980 | Krieger | 280/5 |
| 4,244,522 | 1/1981 | Hartwig | 239/148 |
| 4,383,590 | 5/1983 | Lely | 180/314 |

Primary Examiner—Houston S. Bell, Jr.
Attorney, Agent, or Firm—Claude F. White

[57] ABSTRACT

A vented fuel system for a vehicle includes a plurality of fuel storage tanks and a fuel sump tank with at least one fuel storage tank positioned on each side of the vehicle. The sump tank is positioned on the vehicle between the fuel storage tanks and at a lower elevation than the fuel storage tanks. Each of the fuel storage tanks is connected by a fuel line to the sump tank and all of the fuel storage tanks are interconnected by air transfer lines. One of the fuel storage tanks on each side of the vehicle is provided with a filler spout and a vented fuel cap assembly for closing the filler spout. All of the fuel tanks can be filled from either side of the vehicle, and during refueling, air is expelled from the closed vented fuel cap assemblies and the open filler spout. The plurality of air transfer lines prevent air entrapment in any of the tanks by transferring air between the tanks and subsequent venting of the air through either or both vented fuel cap assemblies. Fuel is gravity fed from the fuel storage tanks to the fuel sump tank.

14 Claims, 3 Drawing Figures

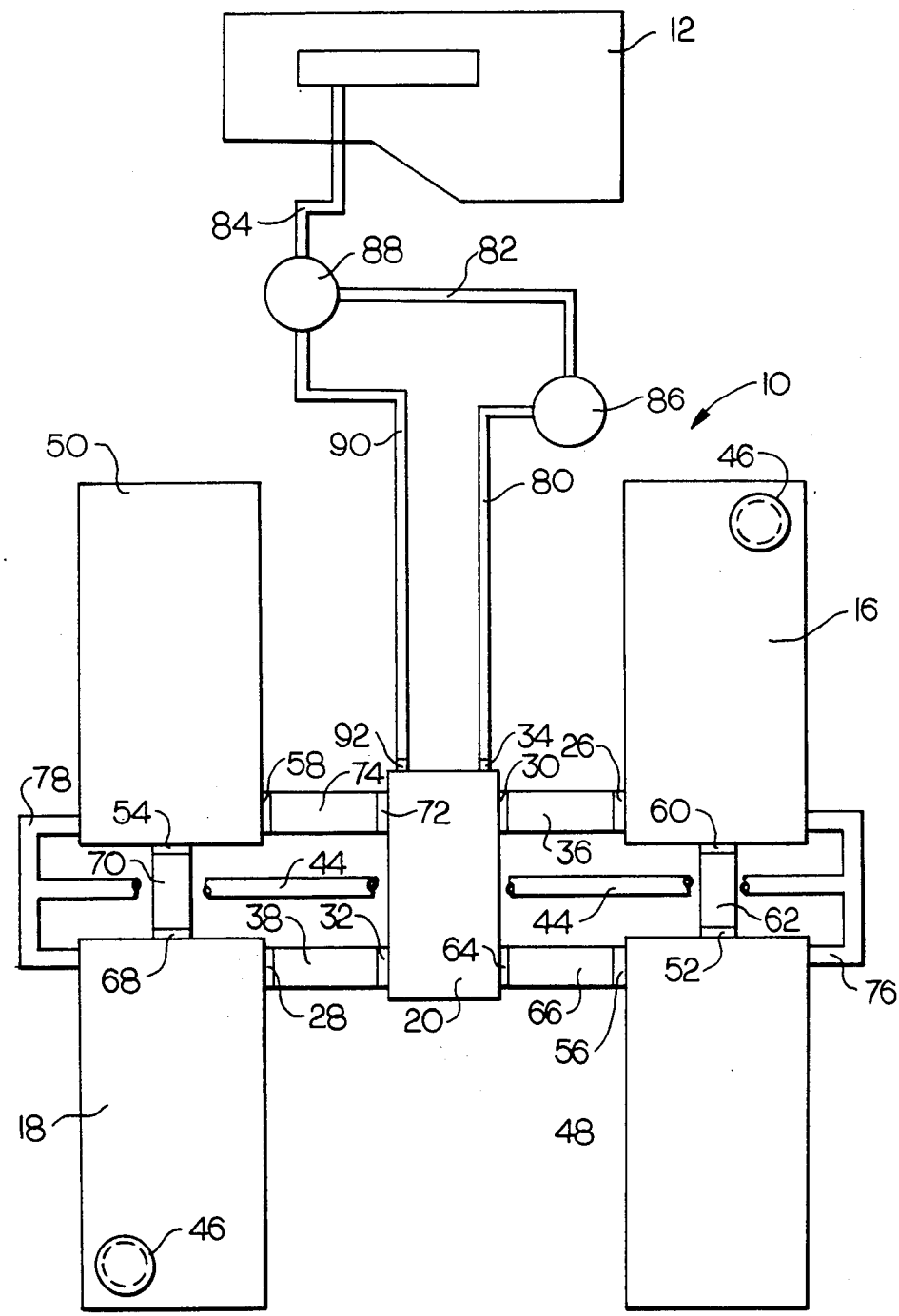
Fig_1_

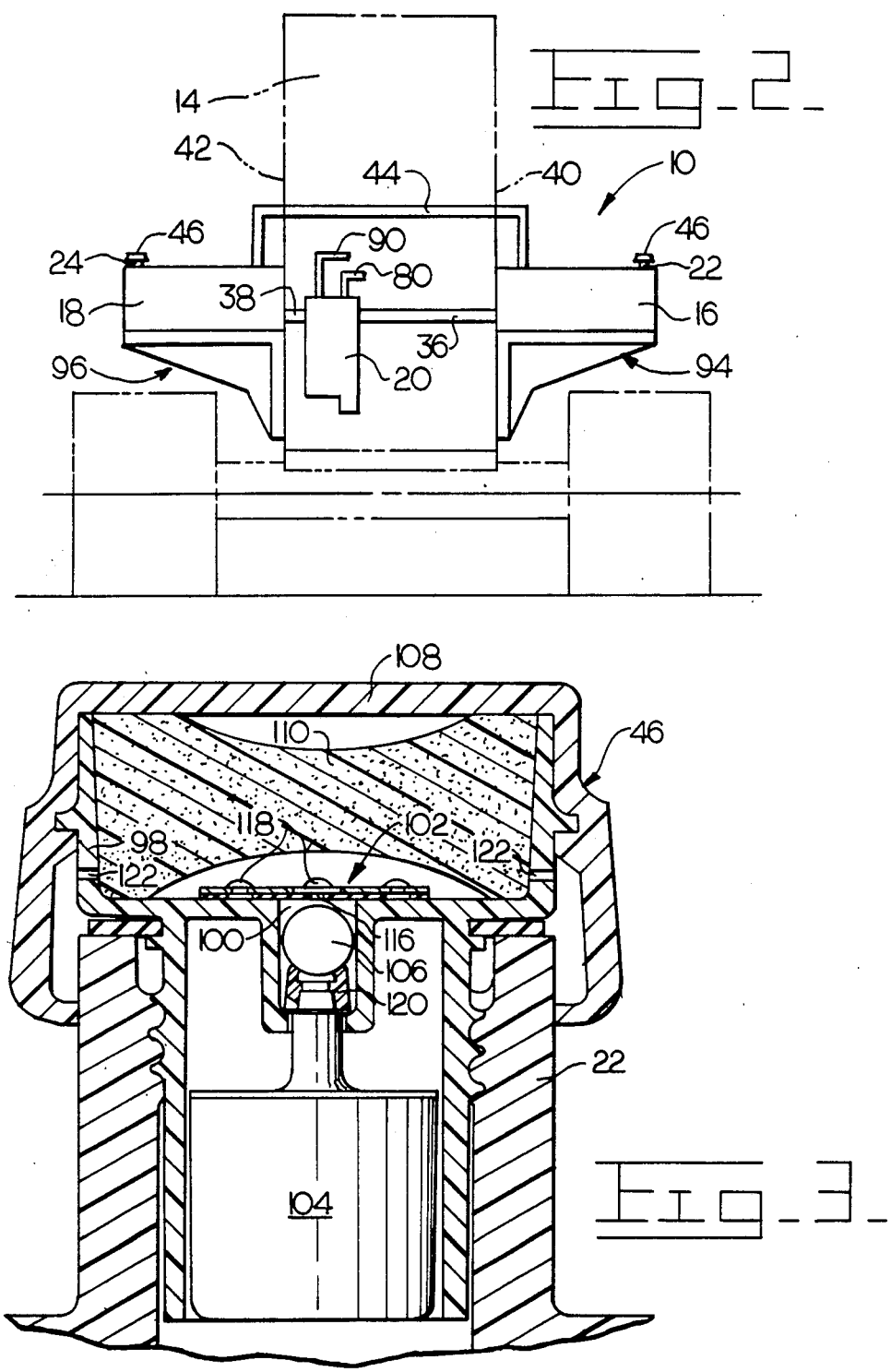

VENTED FUEL SYSTEM FOR A VEHICLE

DESCRIPTION

TECHNICAL FIELD

This invention relates generally to a fuel system for a vehicle, and more particularly, to a vented fuel system having a plurality of fuel storage tanks, a plurality of vented fuel cap assemblies, and a plurality of air transfer lines interconnecting the fuel tanks.

BACKGROUND ART

Agricultural type tractors and vehicles are equipped with one or more fuel storage tanks for supplying fuel to the engine of the tractor. A large supply of fuel is often desirable to provide a long period of operation of the tractor without refueling. In many work situations, it is advantageous to provide sufficient feul for the tractor to operate an entire work day before refueling is required. However, such a fuel supply requires an extremely large fuel tank or a plurality of tanks. If a single tank is used, then placement of the tank is important due to the weight of the fuel. If a plurality of tanks are utilized, placement is important for proper balance and additional fuel lines are required to interconnect the tanks.

One type of vehicle utilizing a plurality of fuel tanks is disclosed in U.S. Pat. No. 3,311,183, issued to H. J. Phillips on Mar. 28, 1967. This tractor has a pair of fuel tanks mounted on opposite sides of the chassis member. The tanks are interconnected by a conduit which allows fuel transfer from one tank to the other, but no air transfer lines are provided, which could cause air entrapment in one of the tanks. A filler spout and cap are provided in only one of the tanks, therefor precluding filling of the tanks from either side of the vehicle.

The present invention is directed to overcoming one or more of the problems as set forth above.

DISCLOSURE OF THE INVENTION

In one aspect of the present invention, a vented fuel system for supplying fuel to the engine of a vehicle includes a pair of fuel storage tanks and a fuel sump tank positioned intermediate the fuel storage tanks. Each fuel storage tank has a filler spout and a fuel outlet opening which is connected to a fuel inlet opening on the fuel sump tank. One of the fuel storage tanks is positioned on each side of the vehicle. A vented fuel cap assembly is removably secured to each of the filler spouts.

Maintaining nearly atmospheric pressure within vehicle fuel tanks is essential to satisfactory operation of the vehicle. Pressure buildup as a result of heat, creation of a vacuum due to fuel depletion, and forming of trapped air pockets due to insufficient air venting must be minimized. On vehicles equipped with multiple fuel tanks, there are generally no provisions to transfer air from one tank to the other during refueling operations. Unless the tanks are efficiently vented, the refueling can be hampered due to air entrapment within the tanks. Often, venting of air is accomplished through valves which are built into the filler spout closure cap. However, most vent valves for venting air in or out of the fuel tanks will not prevent leakage of fuel from the tank through the vent valve. The subject vented fuel system provides multiple vented fuel storage tanks which allows air transfer between the tanks and air flow in and out of the tanks while preventing leakage of fuel from the tanks through the vented fuel cap assemblies.

BRIEF DESCRIPTON OF THE DRAWINGS

FIG. 1 is a diagrammatic schematic of the subject vented fuel system;

FIG. 2 is a diagrammatic front elevational view of the subject vented fuel system with portions of a vehicle shown in phantom line detail; and FIG. 3 is a diagrammatic sectional view of a vented fuel cap assembly used in the subject vented fuel system.

BEST MODE FOR CARRYING OUT THE INVENTION

Referring to the drawings, a vented fuel system 10 for supplying fuel to an engine 12 of a vehicle 14 includes first and second fuel storage tanks 16,18 and a fuel sump tank 20 positioned intermediate the first and second fuel storage tanks 16,18. The tanks 16,18 have filler spouts 22,24 and outlet openings 26,28, respectively. The sump tank 20 has first and second fuel inlet openings 30,32 and at least one fuel outlet opening 34. The outlet openings 26,28 are connected respectively to the sump tank inlet openings 30,32 by first and second fuel lines 36,38. Fuel storage tank 16 is positioned on a first side 40 of the vehicle 14, and the fuel storage tank 18 is positioned on a second opposite side 42 of the vehicle 14. The vented fuel system 10 further includes a first air transfer line 44 which connects the upper portion of the first fuel storage tank 16 to the upper portion of the second fuel storage tank 18. A vented fuel cap assembly 46 is removably secured to each of the filler spouts 16,18 of the first and second fuel storage tanks 16,18.

The vented fuel system 10 can also include a third fuel storage tank 48 positioned on the first side 40 of the vehicle 14, and a fourth fuel storage tank 50 positioned on the second side of the vehicle 14. In the subject embodiment, all of the fuel storage tanks 16,18,48,50 and the fuel sump tank 20 are comprised of non-metallic materials, such as plastic or fiberglass. However, metallic materials could be used to produce the tanks. Fuel storage tanks 48,50 have inlet openings 52,54, respectively, and outlet openings 56,58, respectively. The inlet opening 52 is connected to an outlet opening 60 in the tank 16 by a third fuel line 62, and the outlet opening 56 is connected to an inlet opening 64 in the fuel sump tank 20 by a fourth fuel line 66. In a similar arrangement, the inlet opening 54 is connected to an outlet opening 68 in the tank 18 by a fifth fuel line 70, and the outlet opening 58 is connected to an inlet opening 72 in the fuel sump tank 20 by a sixth fuel line 74. Although the multiple openings in the fuel storage tanks 16,18,48,50 and the fuel sump tank 20 have been indicated as an inlet opening or an outlet opening, fuel can flow through said openings in either direction.

A second air transfer line 76 connects the upper portion of the third fuel storage tank 48 to the first fuel storage tank 16, and a third air transfer line 78 connects the upper portion of the fourth fuel storage tank 50 to the second fuel storage tank 18. All of the air transfer lines 44,76,78 are elevated above the fuel level in the tanks to prevent fuel from being trapped in the air transfer lines which would block air transfer. The fuel sump tank outlet opening 34 is connected to the engine 12 by fuel lines 80,82,84, a priming pump 86, and an injector pump 88. Excess fuel for cooling the injector pump is returned to the fuel sump tank 20 through a line 90 and an inlet opening 92. The first and second fuel storage tanks 16,18 are of substantially like configuration, and are therefor interchangeable.

As best illustrated in FIG. 2, the first, second, third, and fourth fuel storage tanks 16,18,48,50 are positioned on the vehicle 14 on substantially a common first horizontal plane, and the fuel sump tank 20 is positioned on the vehicle 14 on a second lower horizontal plane. With this arrangement, the sump tank 20 is at a lower elevation than the fuel storage tanks 16,18,48,50. The vehicle 14 includes first and second fender assemblies 94,96 arranged on opposite sides 40,42 of the vehicle 14. The first and third fuel storage tanks 16,48 are supported by the first fender assembly 94, and the second and fourth fuel storage tanks 18,50 are supported by the second fender assembly 96.

As best illustrated in FIG. 3, each vented fuel cap assembly 46 includes a body portion 98 defining a passageway 100 therethrough, a valve seat 102 disposed across the passageway 100, a float 104 disposed in the passageway 100, a ball 106 associated with the float 104, and a cover 108 which partially closes one end of the passageway 100. An air filtering element 110 is contained within the passageway between the cover 108 and the body portion 98. The body portion 98 has external threads 112 which engage with internal threads 114 of the filler spout 22, and a compressable washer element 116 serves to seal the body portion 98 to the spout 22. The valve seat 102 has an orifice 116 and is connected to the body portion 98 by a plurality of fasteners 118. The float 104 is responsive to the amount of fuel in the tanks 16,18 and the attitude of the vehicle 14 and is therefor displaceable between a first venting position and a second sealing position. In the subject embodiment, the float 104 is a sealed hollow member of plastic material and is maintained within the passageway 100 by a retainer 120. In the venting position, the ball 106 is spaced from the valve seat 102 for permitting air flow between the interior of the fuel system and the atmosphere. In the sealing position of the float 104, the ball 106 is adapted to engage and seal the orifice 116 of the valve seat 102 and thereby prevent flow of fuel from the fuel system out through the cap assembly 46. The vented fuel cap assemblies 46 on each of the fuel tanks 16,18 are substantially similar.

In the subject embodiment, the ball 106 is a sphere of ceramic material having a density about one-third the density of carbon steel. It is recognized, however, that other materials could be used for the ball 106.

The body portion 98 has a plurality of radial openings 122 which communicate the interior of the cap assembly 46 with the atmosphere. Air entering or exiting through the openings 122 is filtered by the replaceable filter element 110.

INDUSTRIAL APPLICABILITY

The subject vented fuel system 10 is particularly useful with utility vehicles, and more particularly, agricultural type vehicles 14. Vehicles 14 of this type are powered by an internal combustion engine 12 which is supplied with fuel from a fuel system 10 which is carried by the vehicle 14. The fuel system 10 includes two fuel tanks 16,48 on one side of the vehicle 14 and two fuel tanks 18,50 on the opposite side of the vehicle 14. All four tanks 16,18,48,50 are connected by fuel lines 36,38,66,74 to a sump tank 20. Additionally, the fuel tanks 16,48 are connected by a fuel line 62, and the fuel tanks 18,50 are connected by a fuel line 70. Fuel tanks 16,18 have filler spouts 22,24, respectively, which are closed by a vested fuel cap assembly 46. All four fuel storage tanks 16,18,48,50 are interconnected by the air transfer lines 44,76,78.

When the fuel system 10 needs to be refueled, the vented fuel cap assembly 46 is removed from the fuel tank 16 or the fuel tank 18, depending on which side of the vehicle 14 is more convenient to the fuel supply. Assuming that the fuel system 10 will be filled through the fuel tank 16, a fuel supply nozzle is inserted into the filler spout 22 and fuel is pumped into the tank 16. Fuel flows from the tank 16 into the fuel tank 48, into the sump tank 20, and into the fuel tanks 18,50 by way of the interconnecting fuel lines 62,36,66,38, and 74. At the time of refueling, the fuel tanks 16,18,48,50 will contain a large volume of air, since as fuel is consumed, air flows into the tanks through the vented fuel cap assemblies 46 to replace the spent fuel volume. This large volume of air must be vented to the atmosphere as fuel fills the tanks. A portion of the air volume will vent out the open filler spout 22, around the fuel supply nozzle. Another portion will vent out the opposite vented cap assembly 46 on the filler spout 24. In view of the fact that fuel is generally supplied to the fuel system 10 faster than can be vented out the opposite vented cap assembly 46, air entrapment in the fuel system could pose a problem. However, air which cannot vent out the vented cap assembly 46 is transferred from the fuel tanks 18,48, and 50 into the fuel tank 16 and then vented out through the open filler spout 22.

During operation of the vehicle 14 on uneven and sloping terrain, one side 40 of the vehicle 14 is often at a lower elevation than the opposite side 42, or vice versa. At such times the fuel tanks 16,48 will be lower than the tanks 18,50, and additional fuel will flow into the tanks 16,48. This fuel will flow upward into the filler spout 22 and move the float 104 and ball valve 106 upward until the ball valve 106 contacts and seals the orifice 116. As long as the fuel keeps the float in this position, the orifice 116 will remain sealed and no fuel can flow out through the orifice 116 and thus out of the tank 16. When the fuel level drops, the float 104 and ball 106 will move away and unseal the orifice 116. Air can then again be vented in or out through the orifice 116.

If the vehicle 14 should ever become partially or completely inverted, such as in the event of a rollover, the vented fuel cap assemblies 46 will prevent leakage of fuel from the fuel system 10. In such an event, fuel in the tanks 16,18 will flow into the filler spouts 22,24, around the floats 104, and partially fill the passageway 100. The ball 106, however, will separate from the float 105 and move into contact with and seal the orifice 116. The high density of the ball 106 ensures that it will sink in the fuel and seal the orifice 116.

Other aspects, objects, and advantages of this invention can be obtained from a study of the drawings, the disclosure, and the appended claims.

I claim;

1. A vented fuel system for supplying fuel to the engine of a vehicle, comprising:
   a first fuel storage tank having a filler spout and an outlet opening and being positioned on a first side of said vehicle;
   a second fuel storage tank having a filler spout and an outlet opening and being positioned on a second opposite side of said vehicle;
   a fuel sump tank having first and second fuel inlet openings and a fuel outlet opening and being positioned intermediate said first and second fuel storage tanks;

a first air transfer line connecting said first fuel storage tank to said second fuel storage tank;

first and second fuel lines connecting said first and second fuel storage tank outlet openings respectively to said first and second fuel inlet openings of said fuel sump tank; and a vented fuel cap assembly removably secured to one of the filler spouts of said first and second fuel storage tanks.

2. The vented fuel system, as set forth in claim 1, wherein said fuel sump tank is positioned at a lower elevation than said first and second fuel storage tanks.

3. The vented fuel system, as set forth in claim 1, wherein said first and second fuel storage tanks are of substantially like configuration.

4. The vented fuel system, as set forth in claim 1, wherein said fuel sump tank outlet opening is connected to said engine.

5. The vented fuel system, as set forth in claim 1, wherein said vented fuel cap assembly includes:
- a body portion having a passageway and being sealingly engageable with said filler spout;
- a valve seat having an orifice and being disposed across said passageway and being connected to said body portion;
- a float disposed in said passageway and being displaceable between a first venting position and a second sealing position; and
- a ball associated with said float and adapted to engage and seal said orifice in response to said float being displaced to said sealing position.

6. The vented fuel system, as set forth in claim 1, and further including third and fourth fuel storage tanks, each having an inlet opening and an outlet opening, said inlet openings being connected respectively to said first and second fuel storage tanks and said outlet openings being connected to said fuel sump tank.

7. The vented fuel system, as set forth in claim 6, wherein said third fuel storage tank is positioned on the first side of said vehicle and said fourth fuel storage tank is positioned on the second side of said vehicle.

8. The vented fuel system, as set forth in claim 6, wherein said first, second, third, and fourth fuel storage tanks are positioned on said vehicle on substantially a single first horizontal plane and said fuel sump tank is positioned on said vehicle on a second lower horizontal plane.

9. The vented fuel system, as set forth in claim 6, and further including a second air transfer line connecting said third fuel storage tank to said first fuel storage tank and a third air transfer line connecting said fourth fuel storage tank to said second fuel storage tank.

10. The vented fuel system, as set forth in claim 6, wherein said fuel storage tanks and said fuel sump tank comprise non-metallic material.

11. The vented fuel system, as set forth in claim 6, wherein said vehicle includes first and second fender assemblies and said first and third fuel storage tanks are supported by said first fender assembly and said second and fourth fuel storage tanks are supported by said second fender assembly.

12. A vented fuel system and cap assembly for supplying fuel to the engine of a vehicle, for permitting air flow between the fuel system and atmosphere, and for preventing liquid flow from the fuel system through the cap assembly comprising:
- first and third non-metal fuel storage tanks positioned on a first side of said vehicle;
- second and fourth non-metallic fuel storage tanks positioned on a second side of said vehicle;
- a non-metallic fuel sump tank positioned intermediate said first and second sides of said vehicle and at a lower elevation than said fuel storage tanks;
- a plurality of fuel lines, one connecting each of said fuel storage tanks with said fuel sump tank;
- a plurality of air transfer lines, said lines interconnecting each of said fuel storage tanks with all other fuel storage tanks; and
- a vented fuel cap assembly having a body portion having a passageway, a valve mechanism, and a float apparatus, said valve mechanism including a valve seat having an orifice and a ball adapted to engage and seal said orifice.

13. The vented fuel system and cap assemblies, as set forth in claim 12, wherein said ball is a sphere of ceramic material and has a density about ⅓ the density of carbon steel.

14. The vented fuel system and cap assembly, as set forth in claim 12, wherein said float apparatus includes a sealed hollow float member of plastic material and a retainer adapted to maintain said float member within said passageway.

* * * * *